(12) United States Patent
Chen (10) Patent No.: US 10,887,349 B2
(45) Date of Patent: Jan. 5, 2021

(54) SYSTEM AND METHOD FOR ENFORCING SECURITY WITH A VEHICLE GATEWAY

(71) Applicant: Byton Limited, Hong Kong (HK)

(72) Inventor: Abraham Tai-Yu Chen, San Jose, CA (US)

(73) Assignee: Byton Limited, Hong Kong (HK)

( * ) Notice: Subject to any disclaimer, the term of this patent is extended or adjusted under 35 U.S.C. 154(b) by 0 days.

(21) Appl. No.: 15/863,707

(22) Filed: Jan. 5, 2018

(65) Prior Publication Data

US 2019/0215339 A1 Jul. 11, 2019

(51) Int. Cl.
*H04L 29/06* (2006.01)
*G07C 5/08* (2006.01)
(Continued)

(52) U.S. Cl.
CPC ......... *H04L 63/20* (2013.01); *B60W 50/0098* (2013.01); *B60W 50/14* (2013.01); *G07C 5/008* (2013.01); *G07C 5/0808* (2013.01); *G07C 5/0816* (2013.01); *H04L 63/02* (2013.01); *H04L 63/1416* (2013.01); *H04L 63/1425* (2013.01); *G06F 21/552* (2013.01); *G06F 21/566* (2013.01); *G06F 21/602* (2013.01); *G06N 20/00* (2019.01); *G07C 5/006* (2013.01); *H04L 63/0428* (2013.01); *H04L 63/1466* (2013.01)

(58) Field of Classification Search
USPC ........................................................ 701/31.6
See application file for complete search history.

(56) References Cited

U.S. PATENT DOCUMENTS 8,779,921 B1 * 7/2014 Curtiss ................. G08B 25/009
340/506
8,856,936 B2 * 10/2014 Datta Ray ........... H04L 63/1433
726/25

(Continued)

FOREIGN PATENT DOCUMENTS

CN 106650505 A 5/2017
CN 106886202 A 6/2017
(Continued)

OTHER PUBLICATIONS

The International Search Report of PCT Application No. PCT/US2018/068196, dated Feb. 28, 2019, 4 pages.
(Continued)

*Primary Examiner* — Tyler D Paige
(74) *Attorney, Agent, or Firm* — Womble Bond Dickinson (US) LLP (57) ABSTRACT

Disclosed is a method and apparatus for enforcing network security in a motor vehicle. The method may be performed by a vehicle gateway including monitoring data communicated over a communications network of the motor vehicle. The method may also include analyzing the monitored data using one or more machine learning models trained to detect threats in data communicated over the communications network of the motor vehicle. The method may also include detecting a threat in the monitored data, and adjusting a security state of the motor vehicle based on a security level associated with the detected threat. The method may also include performing at least one corrective action based on the security level associated with the detected threat.

14 Claims, 4 Drawing Sheets

(51) Int. Cl.
  *B60W 50/14* (2020.01)
  *B60W 50/00* (2006.01)
  *G07C 5/00* (2006.01)
  *G06N 20/00* (2019.01)
  *G06F 21/55* (2013.01)
  *G06F 21/56* (2013.01)
  *G06F 21/60* (2013.01)

(56) References Cited

U.S. PATENT DOCUMENTS

| | | | | |
|---|---|---|---|---|
| 9,616,828 | B2* | 4/2017 | Ben Noon | H04L 63/1425 |
| 9,843,594 | B1* | 12/2017 | Evans | H04L 63/1425 |
| 10,009,325 | B1* | 6/2018 | David | H04L 12/40 |
| 10,298,612 | B2* | 5/2019 | Galula | H04L 63/123 |
| 10,326,793 | B2* | 6/2019 | Wesie | H04B 1/3822 |
| 10,356,122 | B2* | 7/2019 | Ruvio | H04L 63/1466 |
| 10,484,401 | B2* | 11/2019 | Jung | B60R 16/0231 |
| 10,530,793 | B2* | 1/2020 | Galula | H04L 63/0254 |
| 2005/0046553 | A1* | 3/2005 | Flick | B60R 25/1003 340/426.1 |
| 2008/0167758 | A1* | 7/2008 | Louch | H04L 12/66 701/2 |
| 2009/0178144 | A1* | 7/2009 | Redlich | G06F 21/6209 726/27 |
| 2012/0162423 | A1* | 6/2012 | Xiao | B60R 25/305 348/148 |
| 2013/0204943 | A1* | 8/2013 | Ricci | G06F 3/0484 709/204 |
| 2013/0227648 | A1* | 8/2013 | Ricci | H04W 12/1206 726/3 |
| 2014/0257889 | A1* | 9/2014 | Ashley, Jr. | G06Q 10/063 705/7.11 |
| 2015/0066239 | A1* | 3/2015 | Mabuchi | H04L 63/1408 701/1 |
| 2015/0113638 | A1* | 4/2015 | Valasek | H04L 63/1441 726/22 |
| 2015/0237071 | A1* | 8/2015 | Maher | H04W 4/70 726/1 |
| 2016/0072781 | A1* | 3/2016 | Zhang | H04L 63/065 726/4 |
| 2016/0205117 | A1* | 7/2016 | Laifenfeld | H04B 1/3822 726/23 |
| 2016/0255154 | A1* | 9/2016 | Kim | G09C 1/00 726/25 |
| 2016/0295410 | A1* | 10/2016 | Gupta | H04W 76/18 |
| 2017/0093866 | A1* | 3/2017 | Ben-Noon | H04L 9/3234 |
| 2017/0118038 | A1* | 4/2017 | Ujiie | H04B 1/3822 |
| 2017/0126711 | A1* | 5/2017 | Jung | G06N 3/08 |
| 2017/0185078 | A1* | 6/2017 | Weast | H04W 4/80 |
| 2017/0359365 | A1* | 12/2017 | van den Berg | H04W 12/04 |
| 2018/0034643 | A1* | 2/2018 | Yang | H04L 9/3263 |
| 2018/0060759 | A1* | 3/2018 | Chu | G06N 20/00 |
| 2018/0191738 | A1* | 7/2018 | David | G06F 21/55 |
| 2018/0205754 | A1* | 7/2018 | North | H04L 63/1433 |
| 2018/0219878 | A1* | 8/2018 | Hirshberg | G06F 21/85 |
| 2019/0104108 | A1* | 4/2019 | Rhee | H04L 63/0209 |
| 2019/0308589 | A1* | 10/2019 | Maluf | G06F 30/20 |

FOREIGN PATENT DOCUMENTS

| | | |
|---|---|---|
| CN | 107454117 A | 12/2017 |
| CN | 206766021 A | 12/2017 |
| CN | 105270398 B | 6/2018 |
| WO | 2016139639 A1 | 9/2016 |

OTHER PUBLICATIONS

The Written Opinion of PCT Application No. PCT/US2018/068196, dated Feb. 28, 2019, 6 pages.
Chinese Patent Office Action in application No. 201810996356.3 dated Aug. 21, 2020.

* cited by examiner

SYSTEM AND METHOD FOR ENFORCING SECURITY WITH A VEHICLE GATEWAY

FIELD

The disclosed embodiments relate generally to motor vehicle systems and in particular, but not exclusively, to enforcing security within a communications network of a motor vehicle.

BACKGROUND

Motor vehicles, such as cars, trucks, trains, etc., are becoming more connected. That is, a motor vehicle may include network communication capabilities enabling the motor vehicle to communicate via a network, such as a cellular communications network, with one or more remote systems, and also to receive communications from such systems. Furthermore, the systems of the motor vehicle, such as motor vehicle computer systems, components, user interfaces, etc., may also exchange communications via an internal communications network, such as controller area network (CAN) bus, Ethernet network, wireless network, etc.

The data received, sent, and exchanged between the various systems of the motor vehicle, however, may not be benign. That is, for example, malicious traffic may be purposefully introduced into the motor vehicle via one or more of the communication networks in an attempt to harm one or more systems of the motor vehicle or the passengers. As another example, network traffic that is not necessarily intentionally malicious, such as network communications that inadvertently attempt to cause a non-allowed action (e.g., access encrypted data), misconfigure a motor vehicle system (e.g., set a component operating parameter outside of an acceptable range), or take any other action that could inadvertently damage or impact the safety, operational integrity or efficiency of the vehicles operations. Therefore, there is a need for security within a communications network of a motor vehicle to safeguard the systems of the motor vehicle.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
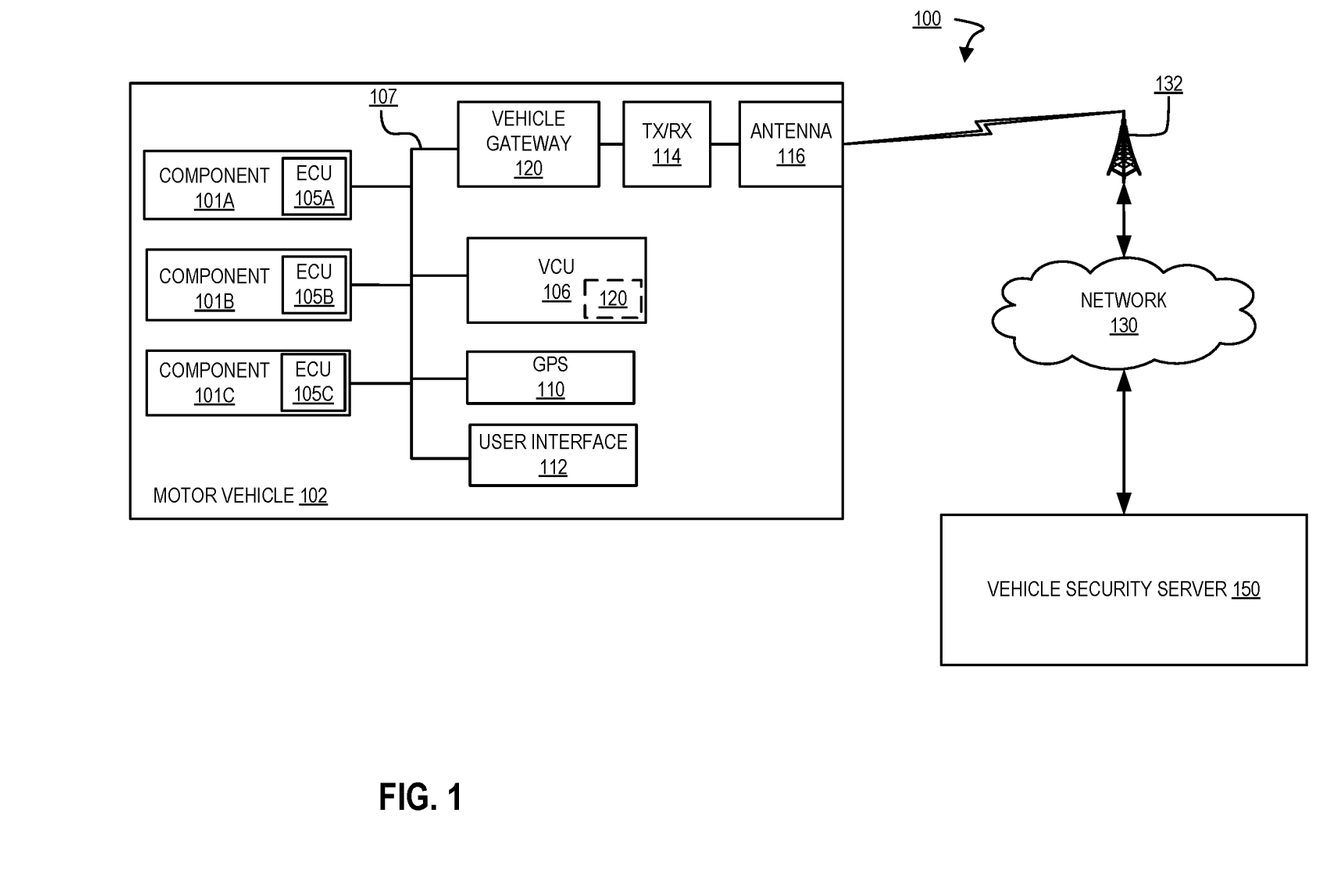
FIG. 1 is a block diagram of an exemplary system architecture for enforcing network security in a motor vehicle.

FIG. 1 is a block diagram of an exemplary system architecture 100 for enforcing network security in a motor vehicle. System 100 implements a method for securely scaling enforcement of network security to communications that occur within a communications network of motor vehicle 102. In embodiments, motor vehicle 102 may b a fully electric vehicle, partially electric (i.e., hybrid) vehicle, or non-electric vehicle (i.e., vehicle with a traditional internal combustion engine). Furthermore, although described mostly in the context of automobiles, the illustrated systems and methods can also be used in other wheeled vehicles such as trucks, motorcycles, buses, trains, etc. It can also be used in non-wheeled vehicles such as ships, airplanes (powered or gliders), and rockets. In fact, the illustrated embodiments can be used in any situation in which it is useful to monitor, detect, and remedy security threats that originate from the exchange of communications on a vehicles communications network. Furthermore, as discussed herein, threats may be considered any communication that impacts the operations, safety, data security, integrity, etc. of one or more systems of a motor vehicle.

System 100 includes motor vehicle 102 communicatively coupled to vehicle security server 150. In the context of this application, "communicatively coupled" means coupled in such a way that data can be exchanged, in one or both directions, between two entities or components (e.g., between the motor vehicle 102 and the vehicle security server 150). Although only one motor vehicle 102 is shown, in other embodiments there need not be a one-to-one correspondence between motor vehicles and the vehicle security server. Furthermore, vehicle security server 150 may be comprised of two or more server computer systems distributed over network 130.

In one embodiment, motor vehicle 102 includes one or more systems, such as components 101A-101C, each having an electronic control unit (ECU) 105A-105C, and each ECU 105A-105C is communicatively coupled via a communications network 107 to a vehicle control unit (VCU) 106. The communications network 107 may be a controller area network (CAN), an Ethernet network, a wireless communications network, another type of communications network, or a combination of different communication networks. VCU 106 is also a system of the motor vehicle 102 and is communicatively coupled to other motor vehicle systems, such as a GPS unit 110, a user interface 112, and a transceiver 114. Transceiver 114 is communicatively coupled to an antenna 116, through which motor vehicle 102 can wirelessly transmit data to, and receive data from, vehicle security server 150. In the illustrated embodiment, motor vehicle 102 communicates wirelessly via antenna 116 with a tower 132, which can then communicate via network 130 (e.g., a cellular communication network, a local area network, a wide area network, etc.) with vehicle security server 150. The motor vehicle may include other systems, with although are not illustrated, would be included in a motor vehicle and exchange communications via network 107.

Components 101A-101C are generally components of the systems of the motor vehicle 102. For example, components 101A-101C can include adjustable seat actuators, power inverters, window controls, electronic braking systems, etc. Vehicle control unit (VCU) 106 is a controller including a microprocessor, memory, storage, and a communication interface with which it can communicate with components 101A-101C, global positioning system (GPS) 110, user interface 112, and transceiver 114 via network 107. In one embodiment VCU 106 is the vehicle's main computer, but in other embodiments it can be a component separate from the vehicle's main or primary computer.

Vehicle security server 150 is communicatively coupled to network 130, so that vehicle security server 150 can exchange data with motor vehicle 102, as well as to exchange information with other systems. For example, vehicle security server 150 may schedule, notify, or consult with other systems, such as a repair facility and/or factory (not shown) via network 130. Although illustrated as a single server, in other embodiment's server 150 can include multiple servers, each of which includes one or more microprocessors, memory, and storage.

In one embodiment, motor vehicle 107 includes vehicle gateway 120. Vehicle gateway 120 is a networking appliance that resides on motor vehicles communications network 107. Vehicle gateway 120 may include a network interface, processor, memory, and one or more processing modules as discussed herein. In one embodiment, vehicle gateway 120 may reside in VCU 106, as well as other components with sufficient access to network 107, processing power, and memory resources to perform the operations described in greater detail herein.

In embodiments, vehicle gateway 120 may be a hardened network appliance that routes communications to/from vehicle systems within network 107, monitors traffic communicated over network 107, blocks traffic, performs firewall functions, etc., as discussed in greater detail herein. In embodiments, the vehicle gateway 120 is considered to be a hardened network appliance because it implements one or more physical and logical barriers for preventing access to the vehicle gateway 120. Vehicle gateway 120 may include pressure switches, electrical connectors, etc. that detects physical access to the internal components of the vehicle gateway 120, such as attempts to open a container housing the vehicle gateway 120. Vehicle gateway 120 may also include one or more software components that detect disallowed logical accesses to the internal components of the vehicle gateway 120, such as attempts to access secure storage, reprogram the vehicle gateway, or otherwise tamper with the operation of vehicle gateway 120. As a hardened appliance, in response to detecting a non-allowed physical or logical access, vehicle gateway 120 responds by taking one or more actions (e.g., shutting down, entering a safe mode, wiping storage and loading a clean configuration, etc.).

Vehicle gateway 120 performs one or more security functions for communications sent/received from motor vehicle 102 (e.g., with external systems via transceiver 114), as well as one or more security functions for communications exchanged between systems (e.g., components 101, VCU 106, GPS 110, user interface 112, etc.) via network 107 of motor vehicle 102. In order to perform the security functions, vehicle gateway 120 monitors the exchange of all communications, such as the communication of data packets transmitted between motor vehicle systems (e.g., source, destination, content, timing, etc.). The data is logged and stored by vehicle gateway 120, such as in a memory or traffic data store, and then analyzed to detect communications, series of communications, etc. that are that indicate a potential security threat within network 107. For example, data exchanged that may set an operating parameter of component 101B outside of an acceptable range, an attempted access to a user's private data stored in vehicle gateway 120 via user interface 112, an attempted access of the memory of VCU 106 received from an external entity (e.g., via network 130), as well as other potentially non-allowed network based communications.

In embodiments, vehicle gateway 120 monitors all data communicated over network 107, whether internally exchanged between motor vehicle systems or to/from motor vehicle and network 130, to detect security threats to motor vehicle 102. A security threat is detected by vehicle gateway 120 based on one or more rules and/or based on analysis of one or more communications with a machine learning model (MLM). For example, vehicle gateway 120 may be configured to analyze communications to detect a condition, and trigger a threat warning, when the condition is detected. For example, if a vehicle operator's password for accessing their private data is entered incorrectly three times, then take a security action (e.g., trigger a warning, lock vehicle systems, etc.). As another example, if a communication is sent from user interface 112 to a particular component 101B that user interface 112 typically does not communicate with, or set a value of component 101C outside of an accepted range, then take another security action (e.g., trigger a warning on the user interface, set value within acceptable range but log error, etc.). Any number of conditions may be monitored by vehicle gateway 120, and any action taken as a result of a condition being detected.

The detection of security threats, however, may include more than detecting a single communication associated with a security condition. For example, a series of communications that simultaneously set certain allowable values of components 101A, 101B, and 101C may be indicative of a security threat, a vehicle security system communicating with several other systems that it does not normally communicate with, receiving a security login for a user and then detecting vehicle customization options outside of the user's saved options, etc. may be indicative of a security threat In one embodiment, vehicle gateway 120 logs data indicative of the communications exchanged over network 107, and then uses one or more MLMs to analyze the logged data. The MLM based analysis enables vehicle gateway 120 to monitor subsets of communications, what system originated communications, what system received communications, sequences of communications, timing of communications, etc. to detect potential security threats when communications occur outside of a typical pattern. In embodiment, the MLMs are received by vehicle security server 150, which as discussed in greater detail below, is responsible for generating the MLMs. Furthermore, vehicle gateway 120 may further refine a received MLM based on the monitored communications within the motor vehicle. For example, one or more communications exchanged over network 107 may trigger a warning that indicating a potential security threat. In response to the warning, an operator of the motor vehicle, vehicle service technician, etc. may indicate that the communications are not a security threat. In embodiments, vehicle gateway 120 would accordingly further train one or more machine learning model based on this data.

In embodiments, once vehicle gateway 120 detects a potential threat, the threat may be scaled according to a predetermined potential severity of the threat. In embodiments, the scaling of threats enables minor threats (e.g., those not effecting critical systems or data security) to trigger certain corrective actions or warnings, while more serious threats (e.g., detecting a major system compromise or an ongoing malicious attack) can trigger different corrective actions, warnings, a vehicle shutdown (e.g., an advanced driver assistance system navigating a vehicle to the side of a road, and shutting the vehicle down), as well as other actions. Furthermore, the scaling can include escalating/de-escalating corrective actions/warnings as threats continue to be detected and/or corrected, the character of the threat changes over time, or the severity to effected systems changes.

Figure 2:
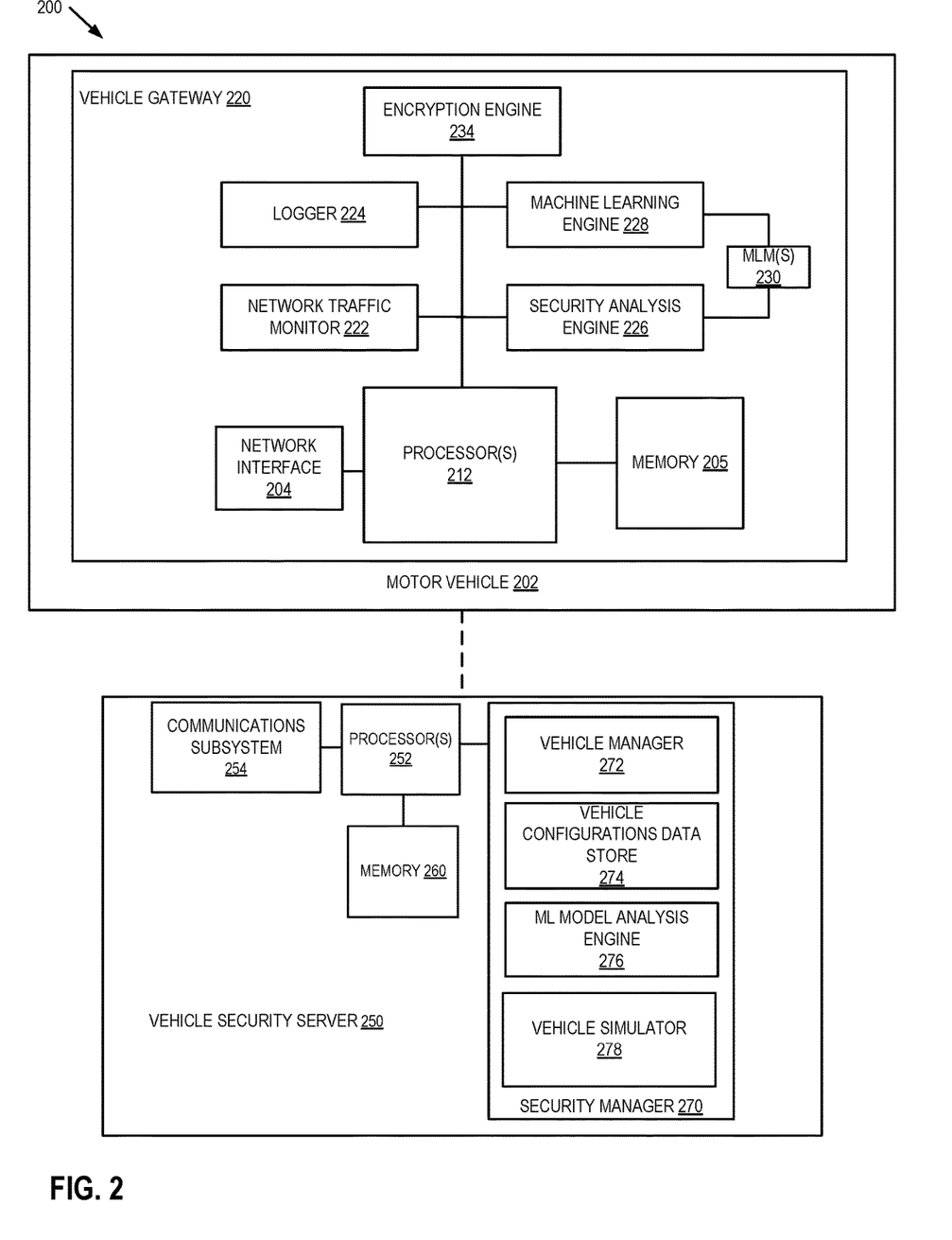
FIG. 2 is block diagram of one embodiment of a system including a motor vehicle and a security server.

Vehicle gateway 120 may therefore detect security threats to the motor vehicle by monitoring communications and communications patterns, whether the communications are internal or external in origin, and respond to perceived threats based on a potential severity of the threat. Furthermore, the use of multiple threat detection mechanisms by the security gateway 120, when deployed within the motor vehicle's communication network 107, enables security gateway 120 to effectively detect threats having different levels of complexity, such as single communications, a series of communications, multiple simultaneous communications, etc. Thus, the threat detection and overall security of the motor vehicle 102, and the various systems contained therein, may be made more secure, FIG. 2 is block diagram of one embodiment of a system 200 including a motor vehicle 202 and a vehicle security server 250. Motor vehicle 202 and a vehicle security server 250 provide additional details for motor vehicle 102 and a vehicle security server 150 discussed above in FIG. 1.

In one embodiment, motor vehicle 202 is a system, which may include one or more processor(s) 212, a memory 205, and a network interface 204. It should be appreciated that motor vehicle 202 may also include, although not illustrated, a user interface and/or hardware interface, motor vehicle controls, one or more power device(s) (e.g., vehicle battery, drive control system, one or more vehicle systems (e.g., VCUs, components, positioning systems, etc.) etc.), a propulsion system (e.g. an electric, gasoline, etc. powered motor), a steering system, a braking system, as well as other components typically associated with motor vehicles. Although only a single network interface 204 is illustrated, it is understood that network interface 204 may be capable of communicatively coupling motor vehicle 202 to any number of wireless subsystems (e.g., Bluetooth, WiFi, Cellular, or other networks), internal motor vehicle communication networks (e.g., a CAN bus, an Ethernet network, a wireless network, etc.) to transmit and receive data streams through one or more communication links.

In one embodiment, vehicle security server 250 is also a system, which may include one or more processor(s) 252, memory 260, and communications subsystem 254. It should be appreciated that vehicle security server 250 may also include, although not illustrated, a user interface (e.g., keyboard, touch-screen, or similar devices), a power device (e.g., a battery), a display screen (e.g., an LCD display), as well as other components typically associated with computer processing systems.

In embodiments, the memories (e.g., memory 205 and memory 260) of motor vehicle 202 and vehicle security server 250 may be coupled to processor(s) to store instructions for execution by the processors, such as processor (s) 212 and processors 252. In some embodiments, the memory is non-transitory, and may store one or more processing modules. In one embodiment, memory 205 of motor vehicle 202 may store one or more processing modules of vehicle gateway 220, such as an encryption engine 234, logger 224, network traffic monitor 222, machine learning engine 228, security analysis engine 226, and one or more machine learning models (MLMs), to implement embodiments described herein. Furthermore, memory 260 of vehicle security server 250 may also include a security manager 270, including a vehicle manager 272, vehicle configuration data store 274, machine learning (ML) model analysis engine 276, and a vehicle simulator 278.

It should be appreciated that the embodiments as will be hereinafter described may be implemented through the execution of instructions, for example as stored in memory or other element, by processor(s) and/or other circuitry of motor vehicle 202 and vehicle security server 250. Particularly, circuitry of motor vehicle 202 and vehicle security server 250, including but not limited to processor(s) 212 and processor(s) 252 may operate under the control of a program, routine, or the execution of instructions to execute methods or processes in accordance with the aspects and features described herein. For example, such a program may be implemented in firmware or software (e.g. stored in memory 205 and/or memory 260) and may be implemented by processors, such as processor(s) 212 and processor(s) 252, and/or other circuitry. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines, or modules described herein may be performed by motor vehicle 202 itself and/or some or all of the functions, engines or modules described herein may be performed by another system connected through network interface 204 to motor vehicle 202. Thus, some and/or all of the functions may be performed by another system, and the results of intermediate calculations may be transferred back to motor vehicle 202. In some embodiments, such other system may comprise a server, such as vehicle security server 250 and/or another server (not shown).

In one embodiment, motor vehicle 202 includes vehicle gateway 220 for enforcing network security in the motor vehicle 202. Network traffic monitor 222 is responsible for monitoring and gathering all communications exchanged over the motor vehicle's communications network(s) (e.g., network 107). As discussed herein, the network communications can include data messages exchanged between internal vehicle systems (e.g., motor vehicle components, a user interface, a positioning system, etc.), as well as data exchanged with external systems (e.g., vehicle security server 250, as well as other external systems). Logger 224 then logs the gathered network communications, and stores the network communications in memory 205. In embodiments, logger 224 may generate a network traffic data store. Furthermore, logger 224 may utilize encryption engine 234 to encrypt the network communications prior to storage in memory 205 so that any sensitive and/or proprietary information contained within the data is protected. In another embodiment, other than storing the communications, logger 224 and/or encryption engine 234 may store data indicative of the communications, such as source, destination, time, purpose, etc.

Security analysis engine 226 is configured to periodically access the logged network communications, using the encryption engine 234 as necessary to decrypt any encrypted information, for security analysis. In one embodiment, the period is selected to ensure that threats to critical motor vehicle systems are detected in a timely manner (e.g., analysis every minute, 1 second, $\frac{1}{10}^{th}$ of a second, etc.). As discussed herein, the security analysis includes detecting one or more preconfigured conditions within the network communications, so that if the condition is detected, then an associated action can be performed. Security analysis engine 226 further utilizes one or more MLM(s) 230 to analyze the logged network communications. The MLM(s), which may include one or more trained neural networks, support vector machines, deep learning models, other MLMs, or a combination of models, enable security analysis engine 226 to analyze multiple communications that may be occurring simultaneously, over a period of time, among different systems, etc. As will be discussed in greater detail below, vehicle security server 250 generates the one or more MLM(s) 230 by performing a simulation of vehicle communications and introducing various threats into the simulation, as well as based on crowdsourced reports from vehicles such as motor vehicle 202.

In one embodiment, security analysis engine 226 associates detected threats (e.g., those detected based on a detected condition associated with a communication, based on MLM analysis of multiple communications, or both) with various security levels based on the potential severity of the detected threat. For example, an initial security level associated with the lack of a detectable threat (e.g., a communication or group of communications are as expected and do not pose any harm to systems of motor vehicle 202); a first security level associated with a suspected attack or threat (e.g., a communication is not exchanged in an expected way, a vehicle system communicates with a component it does not usually communicate with, an incorrect password or security key has been received by a vehicle operator, etc.) that does not necessarily pose physical harm to the operator of the vehicle or vehicle systems; a second security level associated with a higher likelihood of suspected attach (e.g., continued communication between two systems that do not normally communicate with one another, more incorrect passwords entered, attempts to access a user's secured and encrypted data (e.g., user profile data), etc.); a third security level associated with detection of an attack that is currently ongoing (e.g., determining that incoming communications from a network are malicious, detecting one system is attempting to harm another based on a series of communications, etc.); a forth security level associated with an ongoing attack that will impact a major vehicle system (e.g., a purposeful misconfiguration of a critical system, such as the vehicles steering, braking, access to secure storage, etc. that could affect the motor vehicle's operator, passengers, or the motor vehicle itself); and a fifth security level associated with a detected system compromise (e.g., an attempt to physically or logically access the security gateway).

In embodiments, based on the threat level associated with a detected threat, security analysis engine 226 may adjust a security state of the car in order to take one or more corrective actions. For example, for minor threats or no threats, communications may simply be logged, potential threats logged for follow up, and the security state of the car is unchanged. However, for critical threats, such as those associated with the fourth and fifth level threats, the security state of the motor vehicle can be raised and more serious corrective actions, such as shutting down motor vehicle 202, restricting communications between components, wiping a motor vehicle's operating system and installing a clean/safe system, scheduling maintenance, etc. may be triggered and carried out by security analysis engine 226.

Although several exemplary security levels are discussed above, any number of security levels could be implemented by security analysis engine 226 for associating different potential threats with different severity levels. This allows for more granular scaling of the potential threats that may be experienced by motor vehicle 202, and association of different corrective actions with the threat levels.

In one embodiment, security manager 270 of vehicle security server 250 is responsible for generating and providing the MLM(s) 230 to motor vehicle 202. One embodiment for generating such MLM(s) is to train the MLM(s) using vehicle simulator 278 and ML model analysis engine 276. In one embodiment, ML model analysis engine 276 access one or more configuration options for a motor vehicle in vehicle configurations data store 274. The configuration options include selection of various vehicle components, firmware versions, operating system versions, networks deployed, etc. ML model analysis engine 276 feeds a set of configuration options, for example associated with a specific motor vehicle (e.g., motor vehicle 202) or a class of motor vehicles (e.g. a model of a motor vehicle sold by a manufacturer with a set of options), into vehicle simulator 278. Vehicle simulator 278 is an execution environment capable of computationally simulating the operation of a motor vehicle's communication between systems. Furthermore, vehicle simulator 278 may also introduce a plurality of threats into the simulation of the motor vehicle to detect how those threats will impact communication between the systems of the simulated motor vehicle. By doing this, one or more MLM(s) may be trained to recognize/detect normal system communications and patterns occurring on a motor vehicles communication network, as well as communications that are indicative of potential threats. Once trained, vehicle manager 272 provides an appropriate set of MLM(s) to motor vehicle 202 (e.g., for use by a security analysis engine 226, as discussed above).

In one embodiment, ML model analysis engine 276 further receives actual vehicle configurations, for example from motor vehicle 202 as well as other vehicles, for configuring/tailoring specific MLM(s) for specific configurations. That is, motor vehicle 202 may communicate one or more actual configuration options of motor vehicle 202 (e.g., specific components, firmware versions, operating system versions, etc.), that ML model analysis engine 276 to generate specifically trained MLM(s). Furthermore, actual communications and/or detected threats encountered by motor vehicles may also be provided to vehicle security server 250. These actual detected threats from a plurality of motor vehicles enables ML model analysis engine 276 to crowdsource and constantly refine existing MLM(s) based on actual threats/attacks. Similarly, machine learning engine 228 of vehicle gateway 220 may similarly adjust, retrain, and/or refine its own MLM(s) 230 based on actual monitored and detected threats, using a machine learning analysis similar to that performed by vehicle security server 250.

Figure 3:
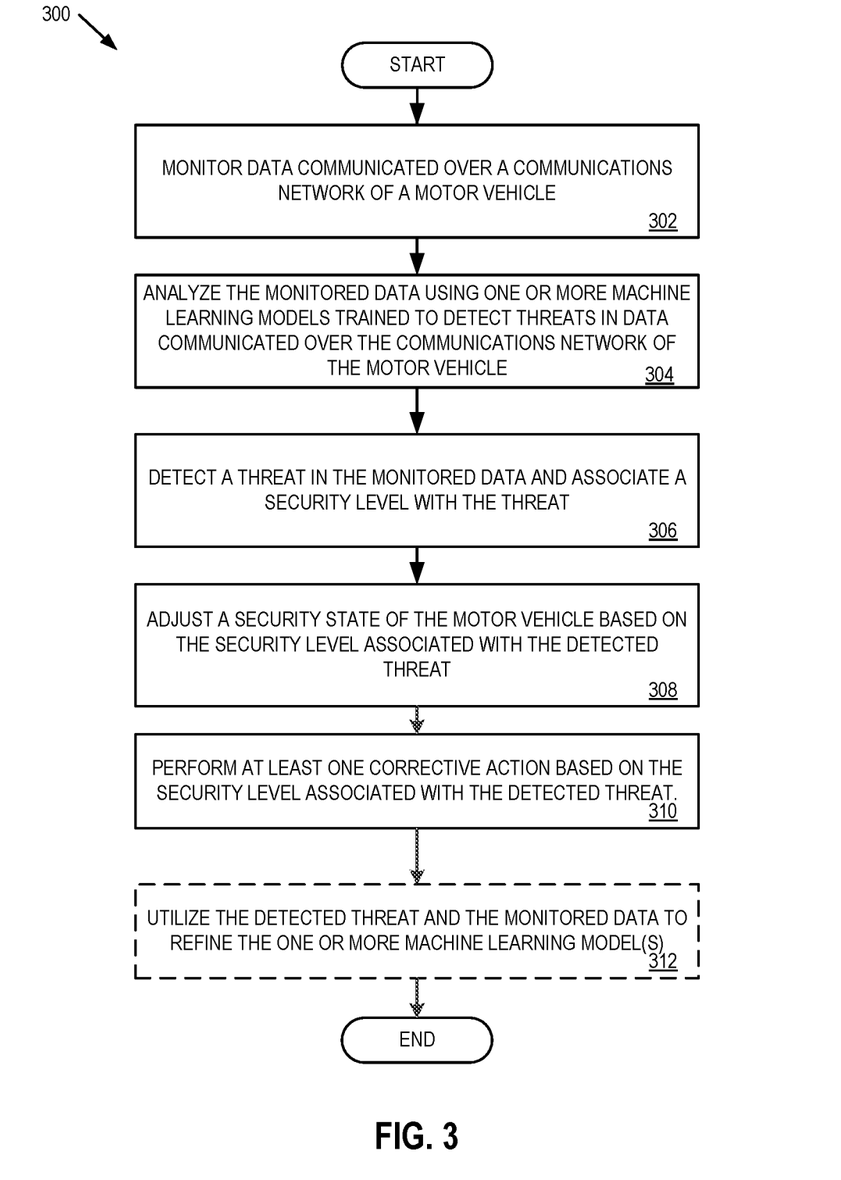
FIG. 3 is a flow diagram of one embodiment of a method for enforcing network security in a motor vehicle.

FIG. 3 is a flow diagram of one embodiment of a method 300 for enforcing network security in a motor vehicle. The method 300 is performed by processing logic that may comprise hardware (circuitry, dedicated logic, etc.), software (such as is run on a general purpose computer system or a dedicated machine), firmware, or a combination. In one embodiment, the method 300 is performed by a security gateway of a motor vehicle (e.g., vehicle gateway 120 or 220 of motor vehicle 102 or 202).

Referring to FIG. 3, processing logic begins by monitoring data communicated over a communications network of a motor vehicle (processing block 302). In embodiments, the data may be network communications between systems of the motor vehicle (e.g., between vehicle components, a VCU, a positioning system, an user interface, etc.) or to/from a system of the motor vehicle and an external system (e.g., a remote server). Furthermore, the communications network of the motor vehicle may include a combination of networks, such as a CAN bus, an Ethernet network, a wireless network, or any combination of networks.

Processing logic then analyzes the monitored data using one or more machine learning models trained to detect threats in data communicated over the communication network of the motor vehicle (processing block 304). As discussed herein, the trained machine learning models are generated by a vehicle security server, and communicated by the server to the motor vehicle. Processing logic may then utilize the trained MLMs when analyzing motor vehicle network communications. Furthermore, the MLMs may be trained for the specific vehicle (e.g., specific vehicle configuration options) in which processing logic is implemented, or a class of vehicles to which the current motor vehicle belongs. Based on the analysis, processing logic detects a threat in the monitored data and associates a security level with the threat (processing block 306). In embodiments, the detected threat may be based on a single communication where data within the communication satisfies a predefined condition indicative of a threat. In other embodiments, one or more communications may collectively be associated with a threat based on analysis performed by one or more machine learning models. In either embodiment, the threat level associated with the detected threat is based on the potential severity of the threat. For example, communications that are merely potentially part of a threat, but which do not impact any critical motor vehicle systems, may be associated with a low threat level. However, communications that directly impact safety of a an operator/passenger of a motor vehicle, the motor vehicle's critical systems, data security of the motor vehicle, or a full system compromise, may be associated with a high threat level. One embodiment of a plurality of different threat levels is discussed in greater detail above.

Processing logic then adjusts a security state of the motor vehicle based on the security level associated with the detected threat (processing block 308), and performs at least one corrective action based on the security level associated with the detected threat (processing block 310). For example, processing logic may restrict one or more actions of an operator of a motor vehicle based on the adjusted security state. As another example, the motor vehicle may be placed into a safe state until a repair can be made to remedy a detected threat. As yet another example, a vehicle's ADAS may safely remove a motor vehicle from a roadway, and shut down the vehicle. Any number of different security states and the corrective actions performed when entering those states may be performed consistent with the discussion herein.

Processing logic then optionally utilizes the detected threat and the monitored data to refine the one or more machine learning model(s) (processing block 312). In embodiments, processing logic may perform a machine learning model analysis using the detected threat and the communications as training data to refine the machine learning model, in order to make the model more effective or more efficient in detecting similar threats in the particular motor vehicle.

Figure 4:
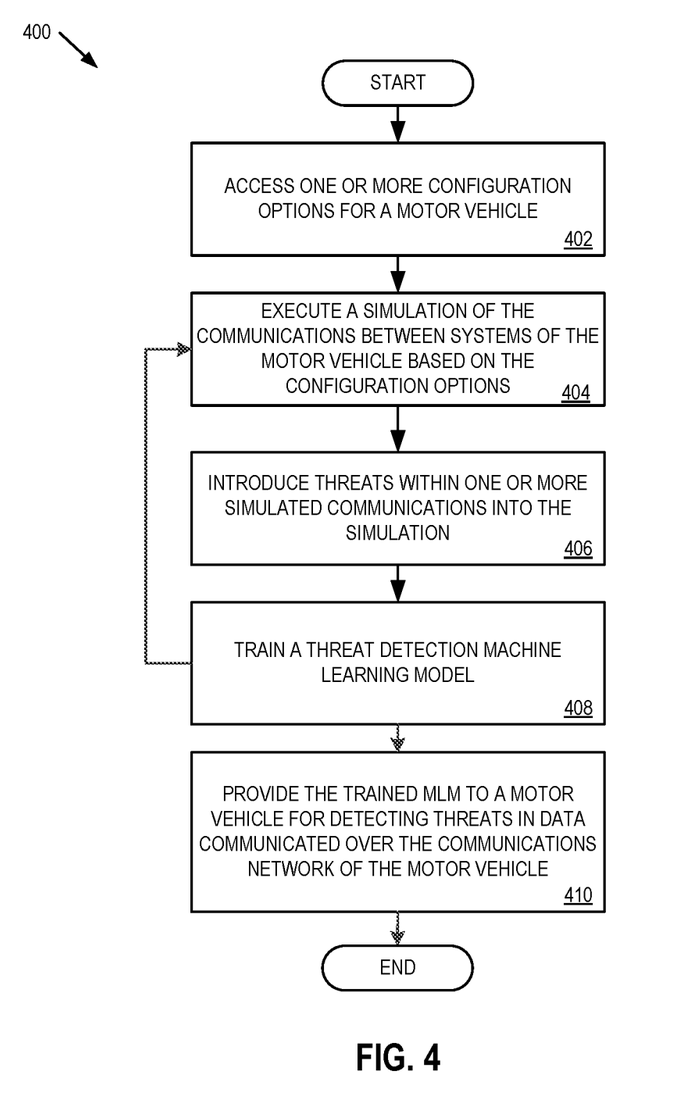
FIG. 4 is a flow diagram of one embodiment of a method for a security server generating a machine learning model for motor vehicle network security including simulation of vehicle network traffic.

FIG. 4 is a flow diagram of one embodiment of a method 400 for security server generating a machine learning model for motor vehicle network security including simulation of vehicle network traffic. The method 400 is performed by processing logic that may comprise hardware (circuitry, dedicated logic, etc.), software (such as is run on a general purpose computer system or a dedicated machine), firmware, or a combination. In one embodiment, the method 400 is performed by a vehicle security server (e.g., vehicle security server 150 or 250).

Referring to FIG. 4, accessing one or more configuration options for a motor vehicle (processing block 402). As discussed herein, the configuration options can include make and model of a motor vehicle, propulsion system, vehicle components, vehicle systems, communication networks, etc. Processing logic utilizes the configuration options to execute a simulation of the communications between systems of the motor vehicle (processing block 404), The simulation, for example, may be executed by a software simulation system that performs a coordinated simulation of all normal or expected communications that might occur between system of the motor vehicle before, during, and after operation of the motor vehicle. Furthermore, the simulation system may also include external communication to/from the simulated motor vehicle with a other systems (e.g., a remote server, a mobile device, nearby motor vehicles, etc.).

Processing logic then introduces threats within one or more simulated communications into the simulation (processing block 406). For example, the threats may be threats that are identifiable via single communications (e.g., within a single data packet exchanged over the motor vehicle's communications network). As another example, the threats may include threats that develop over time via a plurality of communications exchanged between different motor vehicle systems. The normal communications and the threat communications are used by processing logic to train a threat detection machine learning model (processing block 408). The machine learning model may be trained iteratively by introducing any number of threats, variations on the same threat, benign communications, threats hidden within bending communications, etc. Furthermore, actual threats detected by motor vehicles (e.g., processing blocks 302-306 of FIG. 3) may be provided to processing logic of FIG. 4 and used as further training data.

Once the machine learning model has been trained, processing logic provides the trained machine learning model to a motor vehicle for detecting threats in data communicated over the communications network of the motor vehicle (processing block 410). In embodiments, processing logic may provide the trained MLMs to different motor vehicles on a period basis, on demand (e.g., upon request at vehicle startup), as well as at periodic intervals.

Those of skill would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the methods, systems, and apparatus of the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method performed by a vehicle gateway for enforcing network security in a motor vehicle, the method comprising:
receiving, by a processor of a network appliance, a machine learning model from a security server, wherein the received machine learning model is trained by the security server based, at least in part, on a simulation of communications exchanged during operation of a simulated motor vehicle to which the motor vehicle is related;
logging, by the network appliance coupled with a communications network of the motor vehicle into a memory of the network appliance, data communicated over a communications network of the motor vehicle, wherein the data is exchanged between systems of the motor vehicle over the communications network, exchanged between a system of the motor vehicle and an external system, or a combination thereof;
analyzing, by the processor of the network appliance, the data logged into the memory using one or more machine learning models trained to detect threats in data communicated over the communications network of the motor vehicle, wherein a threat in the data comprises data or instructions that will adversely affect the safety, efficiency, data security, or a combination thereof of the motor vehicle, wherein the one or more machine learning models comprise the received machine learning model;
detecting by the processor of the network appliance, a threat in the data logged into the memory;
adjusting, by the processor of the network appliance, a security state of the motor vehicle based on a security level associated with the detected threat; and
performing, by the processor of the network appliance, at least one corrective action based on the security level associated with the detected threat, wherein the at least one corrective action comprises the processor of the network appliance generating and communicating one or more instructions over the communications network of the motor vehicle to adjust a configuration of at least one vehicle system impacted by the detected threat.

2. The method of claim 1, wherein performing at least one corrective action comprises:
in response to detecting that the threat in the data logged into the memory is to a critical system of the motor vehicle, the processor of the network appliance generating and communicating one or more instructions over the communications network of the motor vehicle that activate an advanced driver-assistance system of the motor vehicle to transport the motor vehicle to a predetermined location where the motor vehicle can be shut down.

3. The method of claim 1, wherein performing the at least one corrective action, comprises:
logging the detected threat;
issuing a warning to an operator of the motor vehicle;
issuing a suggested course of action to the operator of the motor vehicle;
scheduling a repair service appointment for the motor vehicle;
reporting the detected threat to a manufacturer of the motor vehicle;
changing one or more configuration options of the system; or
a combination thereof.

4. The method of claim 1, wherein adjusting the security state of the motor vehicle comprises:
raising a low security state of the motor vehicle to a higher security state, wherein one or more operations that could be performed by systems of the motor vehicle at the low security state are prohibited while the motor vehicle is in the higher security state.

5. The method of claim 1, wherein the network appliance is a hardened network appliance configured to detect one or more of physical or logical tampering.

6. The method of claim 1, further comprising:
associating the detected threat with one of a plurality of security levels based on a potential severity of the detected threat.

7. A vehicle gateway for enforcing network security in a motor vehicle, the vehicle gateway comprising:
  a memory; and
  one or more processors of a network appliance communicably coupled with the memory and with a communications network of the motor vehicle, the one or more processors configured to:
  receive a machine learning model from a security server, wherein the received machine learning model is trained by the security server based, at least in part, on a simulation of communications exchanged during operation of a simulated motor vehicle to which the motor vehicle is related,
    log data communicated over the communications network of the motor vehicle into the memory, wherein the data is exchanged between systems of the motor vehicle over the communications network, exchanged between a system of the motor vehicle and an external system, or a combination thereof,
    analyze the data logged into the memory using one or more machine learning models trained to detect threats in data communicated over the communications network of the motor vehicle, wherein a threat in the data comprises data or instructions that will adversely affect the safety, efficiency, data security, or a combination thereof of the motor vehicle, wherein the one or more machine learning models comprise the received machine learning model,
    detect a threat in the data logged into the memory,
    adjust a security state of the motor vehicle based on a security level associated with the detected threat, and
    perform at least one corrective action based on the security level associated with the detected threat, wherein the at least one corrective action comprises the one or more processors of the network appliance generating and communicating one or more instructions over the communications network of the motor vehicle to adjust a configuration of at least one vehicle system impacted by the detected threat.

8. The vehicle gateway of claim 7, wherein the one or more processors performing at least one corrective action further comprises the one or more processors configured to:
  in response to detecting that the threat in the data logged into the memory is to a critical system of the motor vehicle, generate and communicate one or more instructions over the communications network of the motor vehicle that activate an advanced driver-assistance system of the motor vehicle to transport the motor vehicle to a predetermined location where the motor vehicle can be shut down.

9. The vehicle gateway of claim 7, wherein the one or more processors performing the at least one corrective action comprises the one or more processors configured to:
  log the detected threat;
  issue a warning to an operator of the motor vehicle;
  issue a suggested course of action to the operator of the motor vehicle;
  schedule a repair service appointment for the motor vehicle;
  report the detected threat to a manufacturer of the motor vehicle;
  change one or more configuration options of the system; or
  a combination thereof.

10. The vehicle gateway of claim 7, wherein the one or more processors adjusting the security state of the motor vehicle comprises the one or more processors configured to:
  raise a low security state of the motor vehicle to a higher security state, wherein one or more operations that could be performed by systems of the motor vehicle at the low security state are prohibited while the motor vehicle is in the higher security state.

11. The vehicle gateway of claim 7, wherein the network appliance is a hardened network appliance configured to detect one or more of physical or logical tampering.

12. The vehicle gateway of claim 7, wherein the one or more processors are further configured to:
  associating the detected threat with one of a plurality of security levels based on a potential severity of the detected threat.

13. A non-transitory computer readable storage medium including instructions that, when executed by a processor, cause the processor to perform operations for enforcing network security in a motor vehicle, the operations comprising:
  receiving, a network appliance, a machine learning model from a security server, wherein the received machine learning model is trained by the security server based, at least in part, on a simulation of communications exchanged during operation of a simulated motor vehicle to which the motor vehicle is related;
  logging, by the network appliance coupled with a communications network of the motor vehicle into a memory of the network appliance, data communicated over a communications network of the motor vehicle, wherein the data is exchanged between systems of the motor vehicle over the communications network, exchanged between a system of the motor vehicle and an external system, or a combination thereof;
  analyzing, by the network appliance, the data logged into the memory using one or more machine learning models trained to detect threats in data communicated over the communications network of the motor vehicle, wherein a threat in the data or instructions comprises data that will adversely affect the safety, efficiency, data security, or a combination thereof of the motor vehicle, wherein the one or more machine learning models comprise the received machine learning model;
  detecting, by the network appliance, a threat in the data logged into the memory;
  adjusting, by the network appliance, a security state of the motor vehicle based on a security level associated with the detected threat; and
  performing, by the network appliance, at least one corrective action based on the security level associated with the detected threat, wherein the at least one corrective action comprises the processor of the network appliance generating and communicating one or more instructions over the communications network of the motor vehicle to adjust a configuration of at least one vehicle system impacted by the detected threat.

14. The non-transitory computer readable storage medium of claim 13, wherein adjusting the security state of the motor vehicle comprises:
  raising a low security state of the motor vehicle to a higher security state, wherein one or more operations that could be performed by systems of the motor vehicle at the low security state are prohibited while the motor vehicle is in the higher security state.

* * * * *